US011994149B2

(12) United States Patent
Bredwad et al.

(10) Patent No.: US 11,994,149 B2
(45) Date of Patent: May 28, 2024

(54) IMPELLER SEAT WITH A GUIDE PIN FOR A PUMP

(71) Applicant: Xylem Europe GmbH, Schaffhausen (CH)

(72) Inventors: Viktor Bredwad, Spånga (SE); Stefan Ramström, Vallentuna (SE)

(73) Assignee: Xylem Europe GmbH, Schaffhausen (CH)

( * ) Notice: Subject to any disclaimer, the term of this patent is extended or adjusted under 35 U.S.C. 154(b) by 0 days.

(21) Appl. No.: 18/033,922

(22) PCT Filed: Oct. 25, 2021

(86) PCT No.: PCT/EP2021/079519

§ 371 (c)(1),
(2) Date: Apr. 26, 2023

(87) PCT Pub. No.: WO2022/090141

PCT Pub. Date: May 5, 2022

(65) Prior Publication Data

US 2024/0011501 A1 Jan. 11, 2024

(30) Foreign Application Priority Data

Oct. 26, 2020 (EP) .................................... 20203823

(51) Int. Cl.
*F04D 29/42* (2006.01)
*F04D 29/70* (2006.01)

(52) U.S. Cl.
CPC ....... *F04D 29/4293* (2013.01); *F04D 29/708* (2013.01); *F05D 2250/51* (2013.01)

(58) Field of Classification Search
CPC ..... F04D 7/04; F04D 29/2294; F04D 29/4293
See application file for complete search history.

(56) References Cited

U.S. PATENT DOCUMENTS 1,222,984 A * 4/1917 Pharo ..................... G05D 13/00 73/523
8,109,730 B2 * 2/2012 Andersson .......... F04D 29/2288 416/182

(Continued)

FOREIGN PATENT DOCUMENTS

CN 110836188 A 2/2020
EP 1357294 A2 10/2003

(Continued)

OTHER PUBLICATIONS

International Search Report and Written Opinion for International Application No. PCT/EP2021/079519, dated Jan. 28, 2022, 12 pages.

*Primary Examiner* — Brian O Peters
(74) *Attorney, Agent, or Firm* — Buchanan Ingersoll & Rooney PC

(57) ABSTRACT

An impeller seat for a pump, the impeller seat comprising an inlet wall, an inlet radius, a guide pin connected to and extending radially inwards from the inlet wall. The guide pin includes a tip radius. A 15%-circle is offset radially inwards from a circular intersection fifteen percent of the difference between the inlet radius and the tip radius. An 85%-circle is offset radially inwards from the circular intersection eighty-five percent of the difference between the inlet radius and the tip radius. A trailing edge line is between the intersection between the 15%-circle and a trailing edge of the guide pin and the intersection between the 85%-circle and the trailing edge of the guide pin. The trailing edge line is in a range equal to or more than 10 degrees and equal to or less than 30 degrees.

12 Claims, 8 Drawing Sheets

(56) References Cited

U.S. PATENT DOCUMENTS

| | | | | |
|---|---|---|---|---|
| 2009/0092479 | A1 * | 4/2009 | Wagner | F04D 29/181<br>415/121.1 |
| 2022/0290695 | A1 | 9/2022 | Jaeger et al. | |

FOREIGN PATENT DOCUMENTS

| | | | |
|---|---|---|---|
| EP | 1899609 | A1 | 3/2008 |
| EP | 3779201 | A1 | 2/2021 |
| WO | 2020127782 | A1 | 6/2020 |

* cited by examiner

IMPELLER SEAT WITH A GUIDE PIN FOR A PUMP

CROSS-REFERENCE TO RELATED APPLICATIONS

This is the U.S. National Phase of International Application No. PCT/EP2021/079519, filed Oct. 25, 2021, which claims priority to European Application No. 20203823.8, filed Oct. 26, 2020. The disclosure of each of these applications is incorporated herein by reference in its entirety for all purposes.

TECHNICAL FIELD OF THE INVENTION

The present invention relates generally to the field of pumps configured to pump liquid comprising solid matter. Further, the present invention relates to the field of submergible pumps, such as sewage/wastewater pumps, especially configured to pump liquid such as sewage/wastewater that may comprise polymers, hygiene articles, fabrics, rags, disposable gloves, face masks, etc. The present invention relates specifically to an impeller seat suitable for said pumps and applications, and to a pump comprising such an impeller seat and an open impeller. The impeller seat of a pump is also known under the terms suction cover and inlet insert.

The present invention relates to a pump comprising an impeller seat and an open impeller. The open impeller has a cover plate, a centrally located hub and at least two spirally swept blades connected to the cover plate and to the hub, wherein each blade of the impeller comprises a leading edge adjacent the hub and a trailing edge at the periphery of the impeller and a lower edge, wherein the lower edge extends from the leading edge to the trailing edge and separates a suction side of the blade from a pressure side of the blade, wherein the impeller is displaceable back and forth in the axial direction in relation to the impeller seat during operation of the pump. The impeller seat has an axial inlet defined by an inlet wall and an upper surface located downstream the axial inlet, wherein the impeller seat has an inlet radius (R) measured from an axially extending centre axis (A) to a circular intersection between the inlet wall and the upper surface of the impeller seat. The impeller seat comprises a guide pin connected to and extending radially inwards from said inlet wall, wherein the leading edge of the blade is configured to cooperate with the guide pin of the impeller seat during operation of the pump and wherein the lower edge of the blade is located opposite the upper surface of the impeller seat. The guide pin has a tip radius (r) measured from the axially extending centre axis (A) to the radially innermost part of the guide pin, wherein an imaginary 15%-circle is offset radially inwards from said circular intersection fifteen percent of the difference between said inlet radius (R) and said tip radius (r), and wherein an imaginary 85%-circle is offset radially inwards from said circular intersection eighty-five percent of the difference between said inlet radius (R) and said tip radius (r).

BACKGROUND OF THE INVENTION

In sewage/wastewater treatment plants, septic tanks, wells, pump stations, etc., it occurs that solid matter/contaminations such as socks, sanitary towels, papers, disposable diapers, disposable gloves, face masks, rags, etc. obstruct the pump that is submerged in the basin/tank, i.e. socalled hard clog of the pump. This means that solid matter has entered the pump inlet and prevents the impeller from rotating. Thus, the pump is jammed by some solid matter being wedged between the impeller and the pump housing/volute.

When the impeller and the impeller seat are positioned at a fixed distance from each other, the pollutants are sometimes too large to simply pass through the pump. Large pieces of solid matter may in worst case cause the impeller to become wedged, thus seriously damaging the pump, such as bearings and drive unit. Such an unintentional shutdown is costly since it entails expensive, tedious and unplanned maintenance work.

European patent EP 1357294 discloses a pump that comprises an impeller that is arranged to rotate in the volute of the pump, said impeller being suspended by a drive shaft, and the pump comprises an impeller seat having a guide pin. The impeller is located at a fixed distance in the axial direction in relation to the impeller seat. The guide pin is connected to the inlet wall of the impeller seat and extends straight towards the centre of the impeller and towards the centre of the impeller seat.

European patent EP 1899609 discloses a pump that comprises an impeller that is arranged to rotate in the volute of the pump, said impeller being suspended by a drive shaft, and the pump comprises an impeller seat having a guide pin. The impeller is displaceable in the axial direction in relation to the impeller seat during operation of the pump in order to allow larger pieces of solid matter to pass through the pump, contaminations that otherwise would risk to block the pump and/or wedge the impeller. The guide pin is connected to the inlet wall of the impeller seat and extends straight towards the centre of the impeller and towards the centre of the impeller seat. The impeller is displaced by the solid matter when the solid matter enters the gap between the leading edge of the blade and the guide pin and/or the gap between the lower edge of the blade and the upper surface of the impeller seat.

Such pumps and applications are also protected by suitable monitoring and control units that monitors the operation of the pump and controls the operation of the pump based thereon. For instance, when the rotational speed of the impeller decreases and/or the power consumption increased the guide pin and/or the volute of the impeller is partly clogged and the monitoring and control unit enters a cleaning sequence that comprises the step of rotating the impeller in the backward direction, i.e. opposite the direction of rotation of the impeller during normal operation of the pump.

By having the impeller rotating backwards a short period of time the solid matter blocking/clogging the pump may in many situations be jiggled loose whereupon the solid matter may pass through the pump when the pump is reactivated and the impeller once again rotating in the forward direction. However, when the solid matter are large objects and/or comprises long fibres and/or comprises elastic and durable components, the solid matter may become winded around the guide pin and thereby the pump is stopped by the control unit after a couple of unsuccessful cleaning attempts and the pump requires manual maintenance/repair. Such an unintentional shutdown is costly since it entails expensive, tedious and unplanned maintenance work, and thereto the pump station risk to become flooded.

OBJECT OF THE INVENTION

The present invention aims at obviating the aforementioned disadvantages and failings of previously known impeller seats and pumps, and at providing an improved pump.

A primary object of the present invention is to provide an improved impeller seat of the initially defined type that secure operation of the pump also in situations where solid matter, such as large objects and/or long fibres and/or elastic and durable components, has become entangled around the guide pin during normal operation of the pump.

It is also an object of the present invention to provide an improved pump wherein the impeller seat provides a more effective and efficient cleaning during backward rotation of the impeller.

It is also an object of the present invention to provide an improved impeller seat and pump of the initially defined type, wherein said pump in a more reliable manner allows solid matter to pass through the pump without disintegrating the solid matter.

SUMMARY OF THE INVENTION

According to the invention at least the primary object is attained by means of the initially defined impeller seat and pump having the features defined in the independent claim. Preferred embodiments of the present invention are further defined in the dependent claims.

According to the present invention, there is provided a pump of the initially defined type, which is characterized in that a trailing edge line is an axially projected straight line extending between the intersection between the 15%-circle and a trailing edge of the guide pin and the intersection between the 85%-circle and the trailing edge of the guide pin, wherein a trailing edge angle (α) between a radius of the impeller seat intersecting the trailing edge of the guide pin at the 15%-circle and the trailing edge line is equal to or more than 10 degrees and equal to or less than 30 degrees.

Thus, the present invention is based on the insight that by having the guide pin angled in the upstream direction, seen in the direction of rotation of the impeller, in relation to a radius of the impeller seat, the solid matter entangled around the guide pin will be forced/raked towards the center of the impeller seat by the leading edge of the impeller when the impeller is rotated in the backward direction. Thus, by reversing the impeller the solid matter entangled around the guide pin will be removed. The problem of having solid matter entangling around the guide pin is especially appearing and difficult together with pumps having axially displaceable impellers in relation to the impeller seat during operation of the pump.

It shall be pointed out that, the trailing edge angle of the guide pin of a prior art pump having a guide pin extending directly towards the center of the impeller seat is negative or zero.

According to various embodiments of the present invention, the trailing edge angle (α) is equal to or more than 15 degrees and equal to or less than 25 degrees.

A too large trailing edge angle entail that the distal/free end of the guide pin is facing the circumferential direction and thereby the risk of having solid matter spiked by the distal/free end of the guide pin increases, leading to clogging and increased need for reverse operation of the pump. Unnecessary reverse operation of the pump, i.e. backward rotation of the impeller, consume power without pumping liquid. A too small trailing edge angle entail that the solid matter will be winded around the guide pin during reverse operation of the pump, or the solid matter may become wedged between the impeller and the guide pin preventing backward rotation of the impeller.

According to various embodiments of the present invention, a leading edge line is an axially projected straight line extending between the intersection between the 15%-circle and a leading edge of the guide pin and the intersection between the 85%-circle and the leading edge of the guide pin, and wherein a leading edge angle (β) between a radius of the impeller seat intersecting the leading edge of the guide pin at the 15%-circle and the leading edge line is equal to or more than 10 degrees and equal to or less than 30 degrees.

A too large leading edge angle entail that the distal/free end of the guide pin is facing the circumferential direction and thereby the risk of having solid matter spiked by the distal/free end of the guide pin increases, leading to clogging and increased need for reverse operation of the pump. A too small leading edge angle entail that the solid matter will be winded around the guide pin during normal operation of the pump, instead of being guided outwards in the radial direction by the cooperation of the leading edge of the impeller and the leading edge of the guide pin.

According to various embodiments of the present invention, at least one portion of an upper surface of the guide pin is a plane surface, said at least one portion being defined by the 15%-circle, the 85%-circle, the leading edge and the trailing edge. In this preferred context, the plane surface comprises no curvature in the axial direction. Preferably, said at least one portion of the upper surface of the guide pin is tilted in relation to a horizontal plane, wherein the distal end of the guide pin is located upstream the proximal end of the guide pin, seen in the axial direction.

A plane upper surface of the guide pin entail that the axial gap between the leading edge of the blade of the impeller and upper surface of the guide pin, is kept uniform when the axial gap is trimmed. I.e. the distance between the surfaces taken normal to said surfaces is uniform when the mutual axial location of the impeller and impeller seat is altered/trimmed/adjusted.

According to various embodiments of the inventive pump, the scraping off angle (δ) between a projected tangent to the leading edge of the guide pin and a projected tangent to the intersection between the leading edge of the blade and the pressure side of the blade, between the 15%-circle and the 85%-circle, is more than 90 degrees and equal to or less than 120 degrees, and wherein the leading edge of the blade is spirally swept from the hub of the impeller to the lower edge of the blade.

Thereby the solid matter located between the leading edge of the guide pin and the leading edge of the blade will be scraped off outwards upon normal operation of the pump, i.e. forward rotation of the impeller. Thus, said range will promote scraping off solid matter and impede cutting solid matter at the interface between the leading edge of the blade and the leading edge of the guide pin.

According to various embodiments of the inventive pump, the cleaning angle (ε) between a projected tangent to the trailing edge of the guide pin and a projected tangent to the intersection between the leading edge of the blade and the suction side of the blade, between the 15%-circle and the 85%-circle, is equal to or more than 80 degrees and equal to or less than 120 degrees, and wherein the leading edge of the blade is spirally swept from the hub of the impeller to the lower edge of the blade.

Thereby the solid matter entangled around the guide pin will be raked inwards upon reverse operation of the pump, i.e. backward rotation of the impeller.

According to various embodiments of the inventive pump, the radially innermost part of the guide pin is located radially outside the hub of the impeller.

Thereby no solid matter will be able to get stuck between the axial surface of the hub of the impeller and the upper surface of the distal end of the guide pin, and thereto the solid matter raked inwards during reverse operation of the pump will more easily leave the guide pin.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

The present invention relates specifically to the field of submergible pumps especially configured for pumping liquid comprising solid matter, such as sewage/wastewater pumps. Such pumps are configured to pump liquid such as sewage/wastewater that may comprise polymers, hygiene articles, fabrics, rags, disposable gloves, face masks, etc. The present invention relates specifically to an impeller seat suitable for said pumps and applications.

Figure 1:
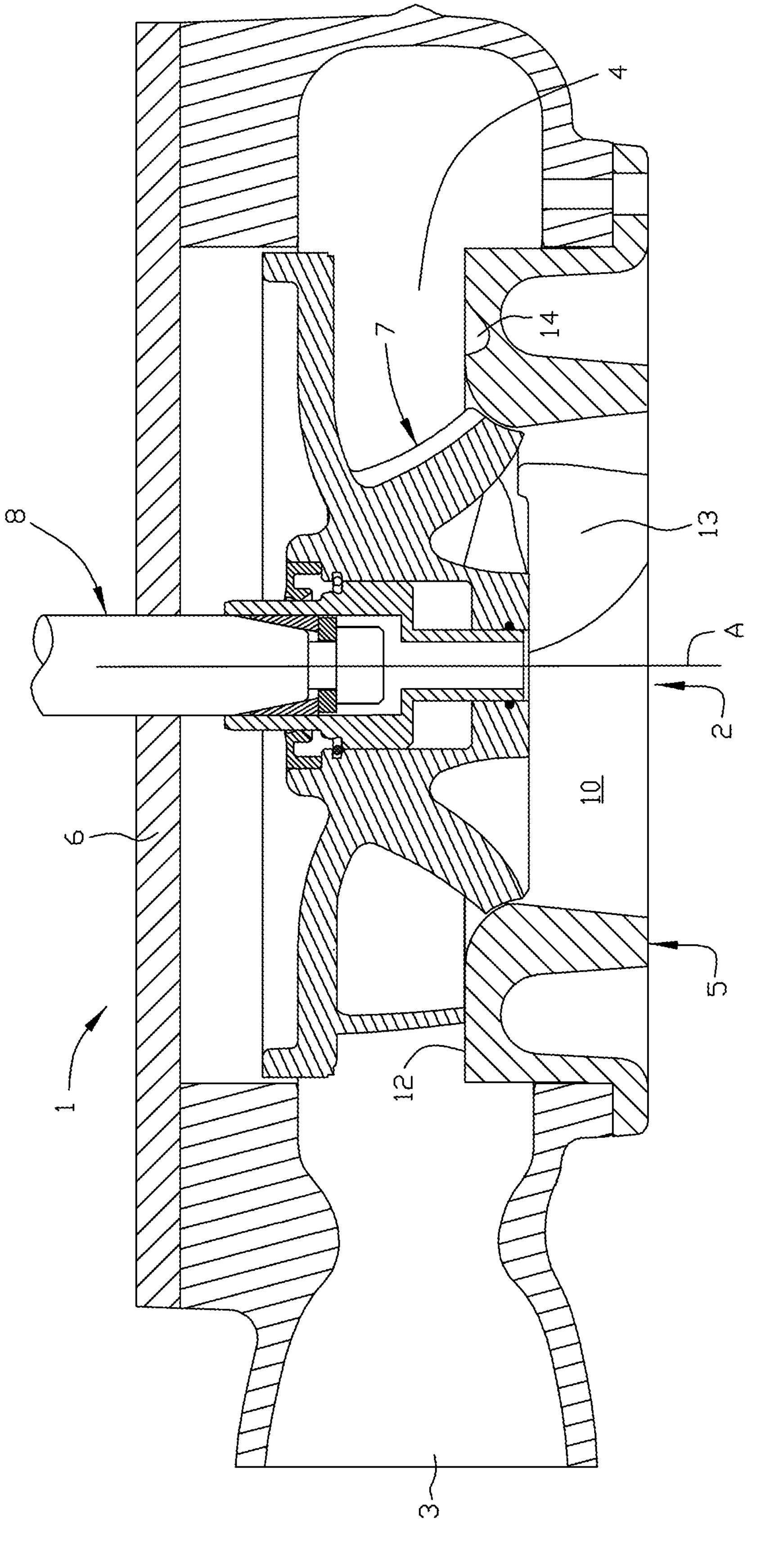
FIG. 1 is a schematic cross-sectional side view of the hydraulic unit of an inventive submergible pump, i.e. a wastewater pump, comprising an inventive impeller seat and an open impeller.

Reference is initially made to FIG. 1, disclosing a schematic illustration of a hydraulic unit of a submergible pump, generally designated 1. A general submergible pump will be described with reference to FIG. 1, and the submergible pump 1 is hereinafter referred to as pump.

The hydraulic unit of the pump 1 comprises an inlet 2, an outlet 3 and a volute 4 located intermediate said inlet 2 and said outlet 3, i.e. the volute 4 is located downstream the inlet 2 and upstream the outlet 3. The volute 4 is partly delimited by an impeller seat, generally designated 5, that encloses the inlet 2. The volute 4 is also delimited by an intermediate wall 6 separating the volute 4 from the drive unit (removed from FIG. 1) of the pump 1. Said volute 4 is also known as pump chamber and said impeller seat 5 is also known as suction cover or wear plate or inlet insert. In some applications, the outlet of the hydraulic unit also constitutes the outlet 3 of the pump 1, and in other applications the outlet of the hydraulic unit is connected to a separate outlet 3 of the pump 1. The outlet 3 of the pump 1 is configured to be connected to an outlet conduit (not shown). Thereto the pump 1 comprises an open impeller, generally designated 7, wherein the impeller 7 is located in the volute 4, i.e. the hydraulic unit of the pump 1 comprises an impeller 7.

The drive unit of the pump 1 comprises an electric motor arranged in a liquid tight pump housing, and a drive shaft 8 extending from the electric motor through the intermediate wall 6 and into the volute 4. The impeller 7 is connected to and driven in rotation by the drive shaft 8 during operation of the pump 1, wherein liquid is sucked into said inlet 2 and pumped out of said outlet 3 by means of the rotating impeller 7 when the pump 1 is active. The pump housing, the impeller seat 5, the impeller 7, and other essential components, are preferably made of metal, such as aluminum and steel. The electric motor is powered via an electric power cable extending from a power supply, and the pump 1 comprises a liquid tight lead-through receiving the electric power cable.

According to preferred embodiments, the pump 1, more precisely the electric motor, is operatively connected to a control unit, such as an Intelligent Drive comprising a Variable Frequency Drive (VFD). Thus, said pump 1 is configured to be operated at a variable operational speed [rpm], by means of said control unit. According to preferred embodiments, the control unit is located inside the liquid tight pump housing, i.e. it is preferred that the control unit is integrated into the pump 1. The control unit is configured to control the operational speed of the pump 1. According to alternative embodiments the control unit is an external control unit, or the control unit is separated into an external sub-unit and an internal sub-unit. The operational speed of the pump 1 is more precisely the rpm of the electric motor and of the impeller 7 and correspond/relate to a control unit output frequency. The control unit is configured and capable of operating the pump 1 and impeller 7 in a normal direction of rotation, i.e. forward, in order to pump liquid, and in an opposite direction of rotation, i.e. backwards, in order to clean or unblock the pump 1 and impeller 7.

The components of the pump 1 are usually cold down by means of the liquid/water surrounding the pump 1. The pump 1 is designed and configured to be able to operate in a submerged configuration/position, i.e. during operation be located entirely under the liquid surface. However, it shall be realized that the submersible pump 1 during operation must not be entirely located under the liquid surface but may continuously or occasionally be fully or partly located above the liquid surface. In dry installed applications the submergible pump 1 comprises dedicated cooling systems.

The present invention is based on a new and improved impeller seat 5, that is configured to be used in pumps 1 suitable for pumping liquid comprising solid matter, for instance wastewater/sewage comprising matter that temporarily may clog and block the pump 1. When solid matter clog/block the pump 1 the torque and consumed power increases and in order not to strain the pump 1 the control unit may enter a cleaning sequence whereupon the impeller 7 is rotating backwards for a short period of time. If such backward operation, one or several attempts, is not sufficient, maintenance staff need to visit the pump station and manually clean/service the pump 1.

According to the invention the impeller 7 is displaceable back and forth in the axial direction in relation to the impeller seat 5 during operation of the pump 1, in order to let larger pieces of solid matter pass through the volute 4 of the pump 1.

Figure 2:
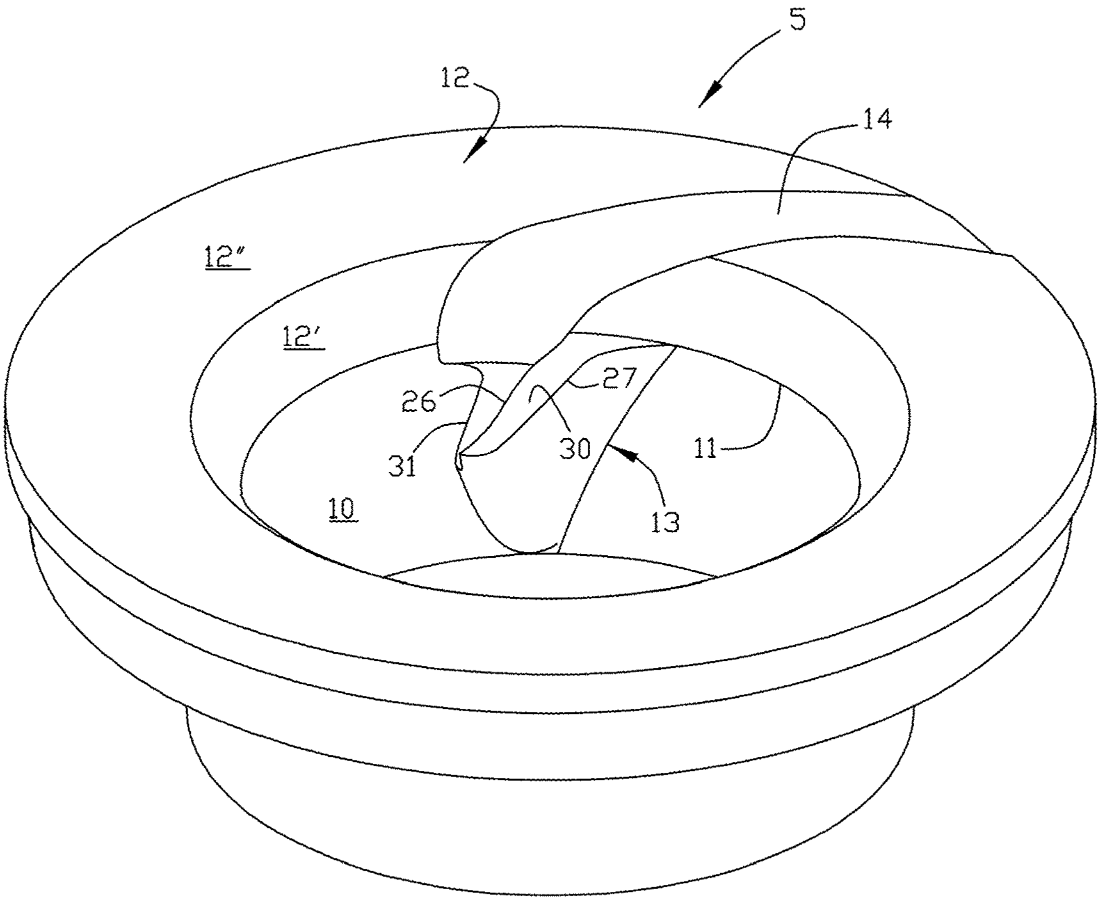
FIG. 2 is a schematic perspective view from above of an inventive impeller seat according to a first embodiment.
Figure 3:
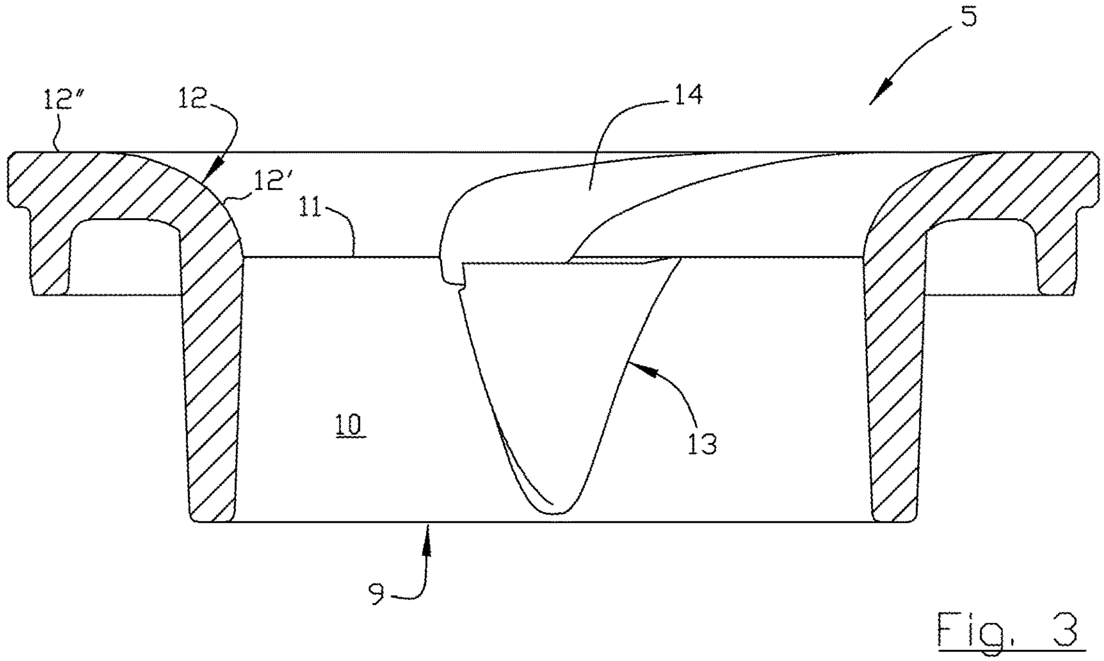
FIG. 3 is a schematic cross-sectional side view of the impeller seat according to FIG. 2.
Figure 8:
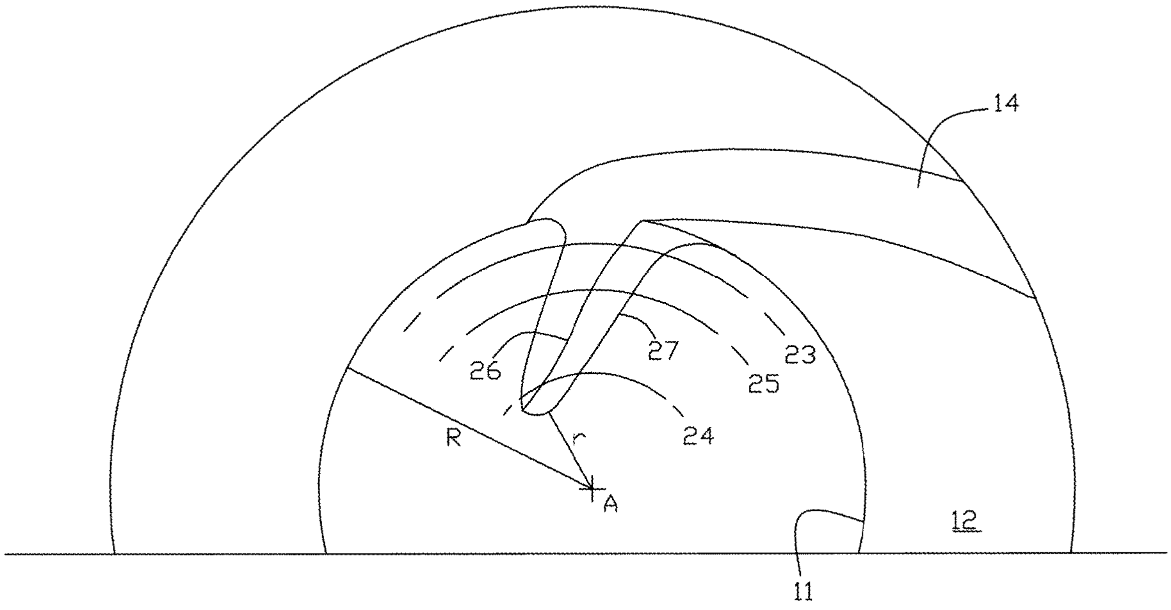
FIG. 8 is a schematic view from above of a part of the impeller seat according to the first embodiment (FIG. 6)

Reference is now made to FIGS. 2 and 3 disclosing an inventive impeller seat 5 according to a first embodiment. Reference is partly made to FIG. 8.

The impeller seat 5 comprises an axial inlet 9 defined by an inlet wall 10, wherein the impeller seat 5 has an inlet radius (R) measured from an axially extending centre axis (A) to the circular intersection 11 between the inlet wall 10 and an upper surface 12 of the impeller seat 5.

The inlet wall 10 is more or less cylindrical or slightly conical having a decreasing flow area in the downstream direction, i.e. upwards in FIG. 3. The upper surface 12 of the impeller seat 5 is the surface that is seen from above, and the circular intersection 11 is the plane of the impeller seat 5 having the smallest flow area, i.e. the transition between the inlet wall 10 and the upper surface 12. Thus, the upper surface 12 is located downstream the axial inlet 9. The upper surface 12 may comprise a flat section 12' and/or an arc-shaped section 12", wherein the flat section 12' may be located in a horizontal plane or be tilted inwards/downwards and the arc-shaped section 12" interconnects the flat section 12' and the inlet wall 10. According to various embodiments the upper surface 12 only comprises an arc-shaped section 12" extending all the way from the inlet wall 10 to the periphery of the impeller seat 5. According to other various embodiments the upper surface 12 only comprises a flat section 12' extending all the way from the inlet wall 10 to the periphery of the impeller seat 5.

Said impeller seat 5 comprises a guide pin 13 connected to and extending radially inwards from said inlet wall 10, the guide pin 13 having a tip radius (r) measured from the axially extending centre axis (A) to the radially innermost part of the guide pin 13. The main function of the guide pin 13 is to scrape off solid matter from the impeller 7 and feed the solid matter outwards, during normal operation of the pump 1.

According to various embodiments, said impeller seat 5 also comprises a feeding groove 14 arranged in the upper surface 12 of the impeller seat 5 and extending from the inlet wall 10 to the periphery of the impeller seat 5. An inlet of the feeding groove 14 is located adjacent and upstream the guide pin 13, seen in the direction of rotation of the impeller 7. The feeding groove 14 is preferably swept in the direction of rotation of the impeller 7, seen from the inlet wall 10 towards the periphery. Part of the inlet of the feeding groove 14 may be arranged in the inlet wall of the impeller seat 5. The function of the feeding groove 14 is to feed the solid matter outwards, during normal operation of the pump 1.

Figure 4:
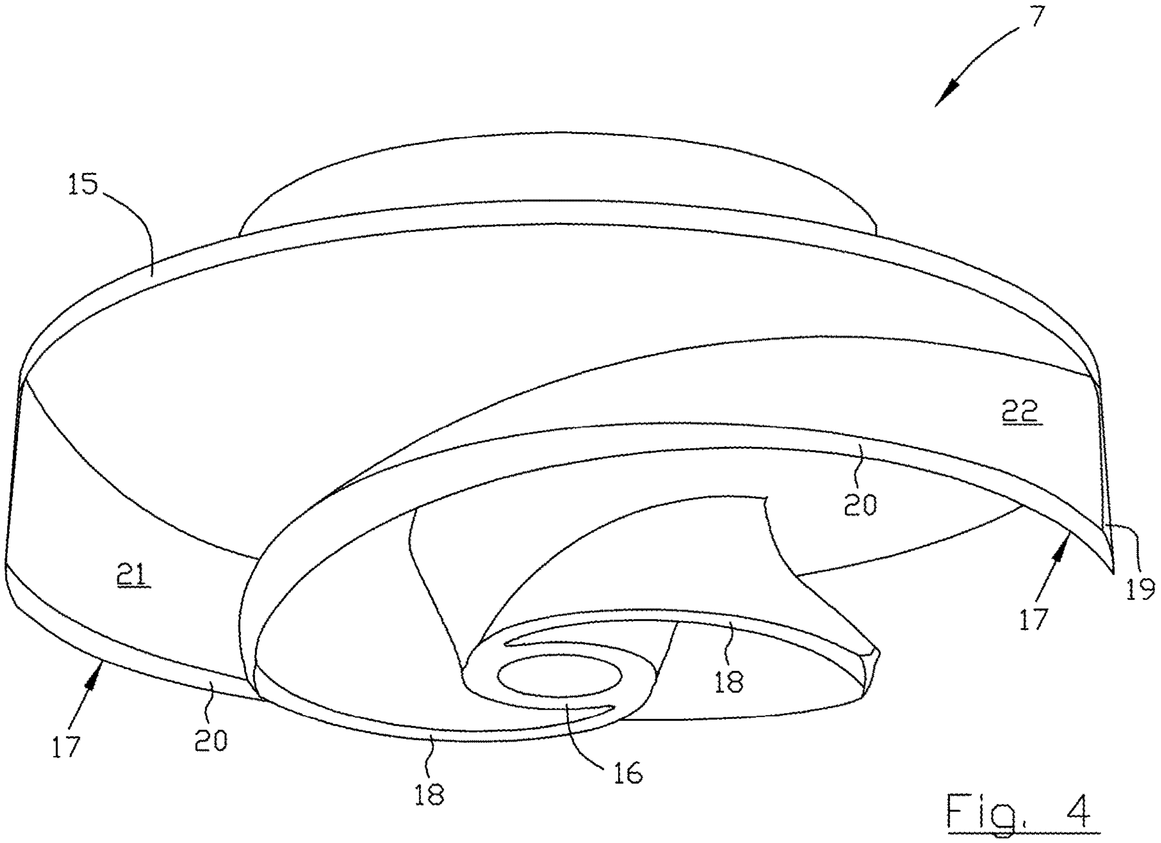
FIG. 4 is a schematic perspective view from below of an open impeller.
Figure 5:
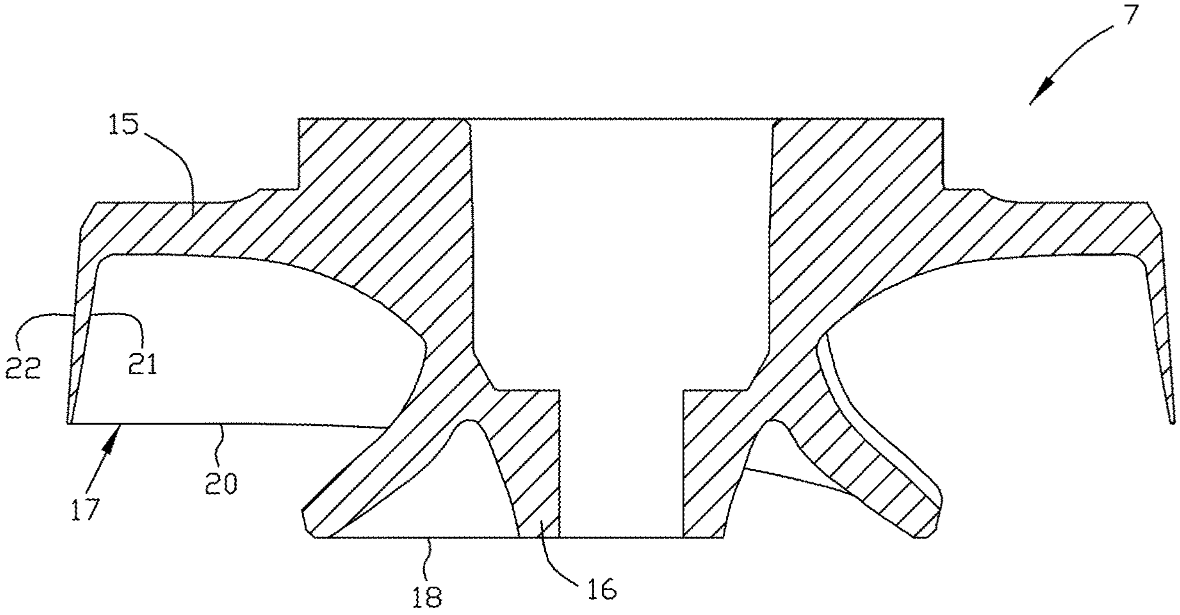
FIG. 5 is a schematic cross-sectional side view of the impeller according to FIG. 4.

Reference is now made to FIGS. 4 and 5 disclosing the open impeller 7. The impeller 7 comprises a cover plate 15, a centrally located hub 16 and at least two spirally swept blades 17 connected to the cover plate 15 and to the hub 16. The blades 17 are equidistant located around the hub 16. The blades 17 are also known as vanes, and the cover plate 15 is also known as upper shroud.

The blades 17 are swept, seen from the hub 16 towards the periphery of the impeller 7, in a direction opposite the direction of rotation of the impeller 7 during normal (liquid pumping) operation of the pump 1. Thus, seen from below, i.e. FIG. 4, the direction of rotation of the impellers 7 during normal operation is counterclockwise.

Each blade 17 comprises a leading edge 18 adjacent the hub 16 and a trailing edge 19 at the periphery of the impeller 7. The leading edge 18 of the impeller 7 is located upstream the trailing edge 19, wherein two adjacent blades 17 together defines a channel extending from the leading edges 18 to the trailing edges 19. The leading edge 18 is located at the inlet of the impeller seat 5, and the leading edge 18 is spirally swept from the hub outwards, in the same direction as the sweep of the blade 17. During operation, the leading edges 18 grabs hold of the liquid, the channels accelerate and/or add pressure to the liquid, and the liquid leaves the impeller 7 at the trailing edges 19. Thereafter the liquid is guided by the volute 4 of the hydraulic unit towards the outlet 3. Thus, the liquid is sucked into the impeller 7 and pressed out of the impeller 7. Said channels are also delimited by the cover plate 15 of the impeller 7 and by the impeller seat 5 of the volute 4. The diameter of the impeller 7 and the shape and configuration of the channels/blades determines the pressure build up in the liquid and the pumped flow.

Each blade 17 also comprises a lower edge 20, wherein the lower edge 20 extends from the leading edge 18 to the trailing edge 19 and separates a suction side/surface 21 of the blade 17 from a pressure side/surface 22 of the blade 17. The lower edge 20 is configured to be facing and located opposite the impeller seat 5 of the pump 1. Thus, the suction side 21 of one blade 17 is located opposite the pressure side 22 of an adjacent blade 17. The leading edge 18 and the trailing edge 19 also separates the suction side 21 from the pressure side 22. The leading edge 18 is preferably rounded. The lower edge 20 of the blade 17 is connected to the leading edge 18 at a location corresponding to the circular intersection 11 of the impeller seat 5.

Figure 6:
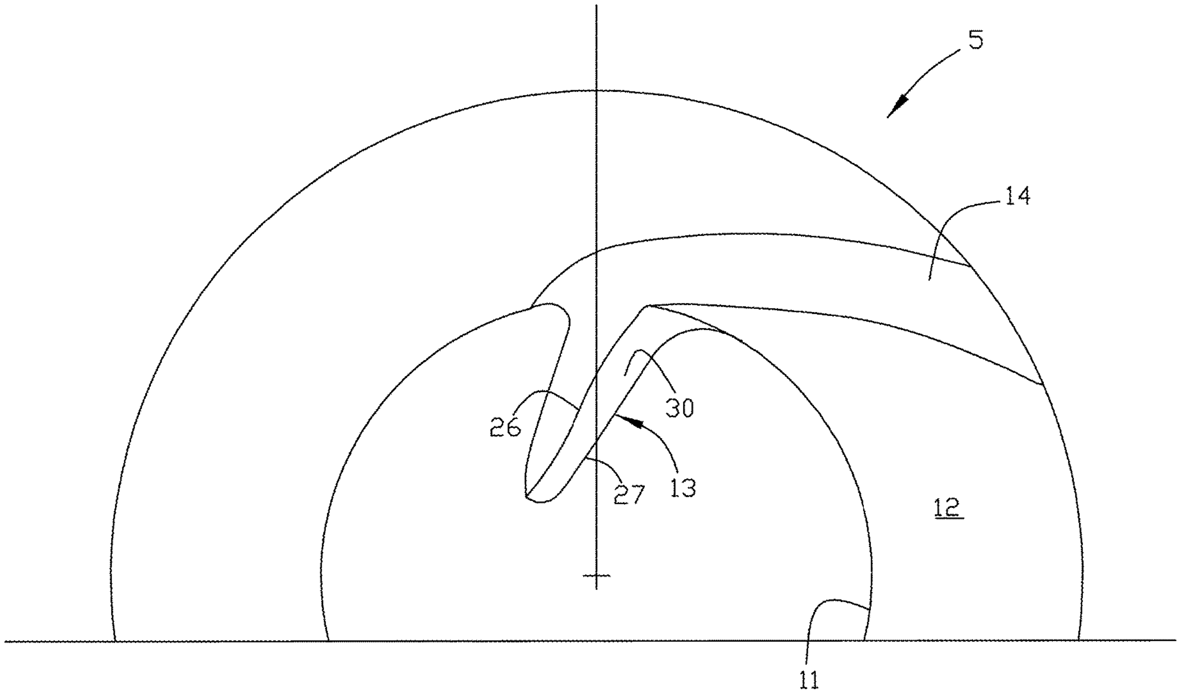
FIG. 6 is a schematic view from above of a part of the impeller seat according to the first embodiment.
Figure 7:
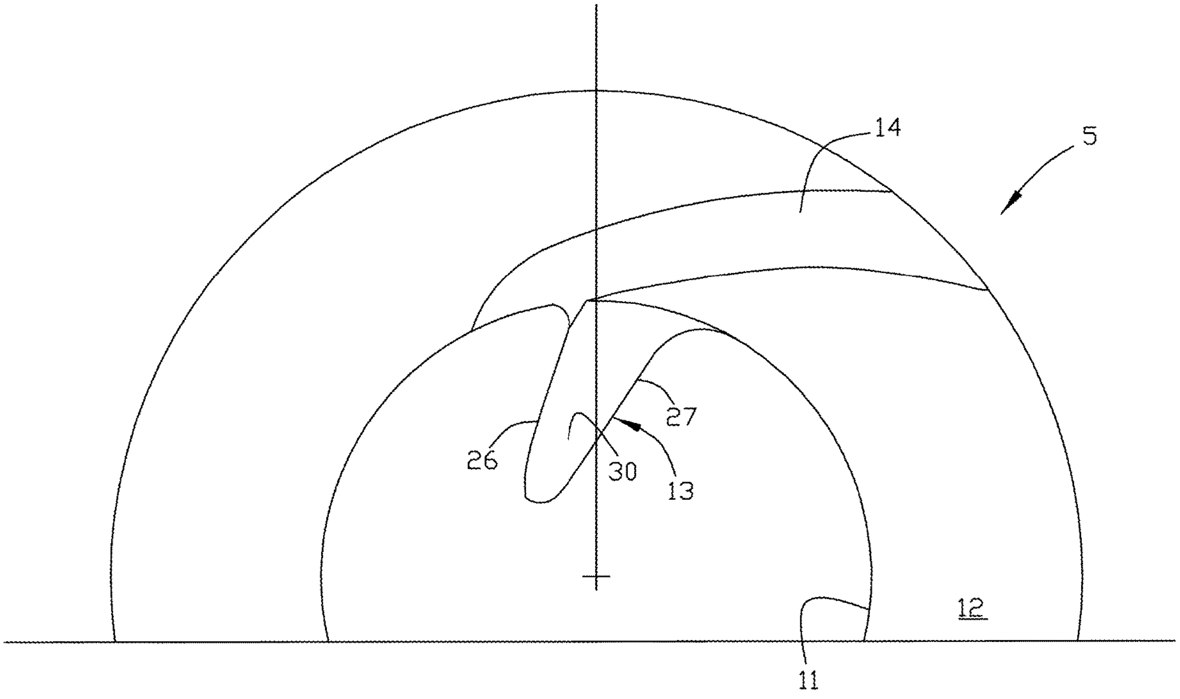
FIG. 7 is a schematic view from above of a part of the impeller seat according to a second embodiment.
Figure 9:
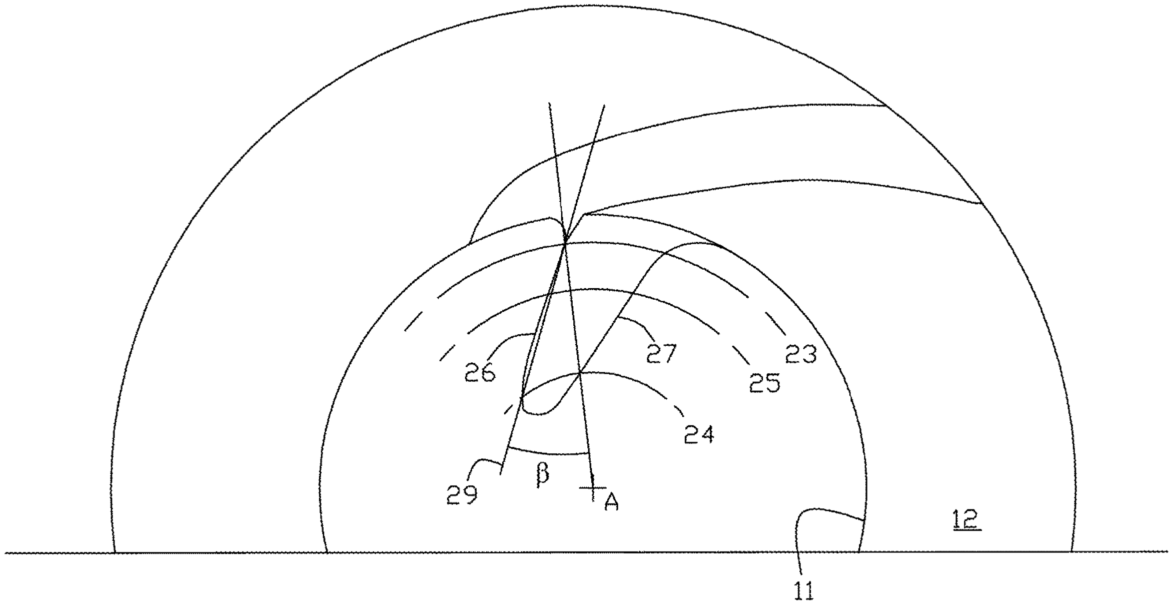
FIG. 9 is a schematic view from above of a part of an impeller seat according to the second embodiment (FIG. 7) disclosing a leading edge angle.

Reference is now made to FIGS. 6-11, wherein FIGS. 7 and 9 disclose an impeller seat 5 according to a second embodiment. The first and second embodiment are alike if nothing else is indicated.

The present invention is based on a new design, configuration and function of the guide pin 13, i.e. that the guide pin 13 is angled in relation to a radius of the impeller seat 5, see FIGS. 6 and 7. The angle of the guide pin 13 is defined using imaginary circles, wherein an imaginary 15%-circle, denoted 23, is offset radially inwards from said circular intersection 11 fifteen percent of the difference between said inlet radius (R) and said tip radius (r), and wherein an imaginary 85%-circle, denoted 24, is offset radially inwards from said circular intersection 11 eighty-five percent of the difference between said inlet radius (R) and said tip radius (r). Thereto, an imaginary 40%-circle, denoted 25, is defined that is offset radially inwards from the circular intersection 11 forty percent of the difference between the inlet radius (R) and the tip radius (r). Said 15%-circle and said 85%-circle are used since the impeller seat 5 comprises a rounded transition between the guide pin 13 and the inner wall 10 and comprises a rounded tip, and thereby the shape of the innermost and outermost parts of the guide pin 13 are disregarded when defining the overall shape of the guide pin 13.

Figure 10:
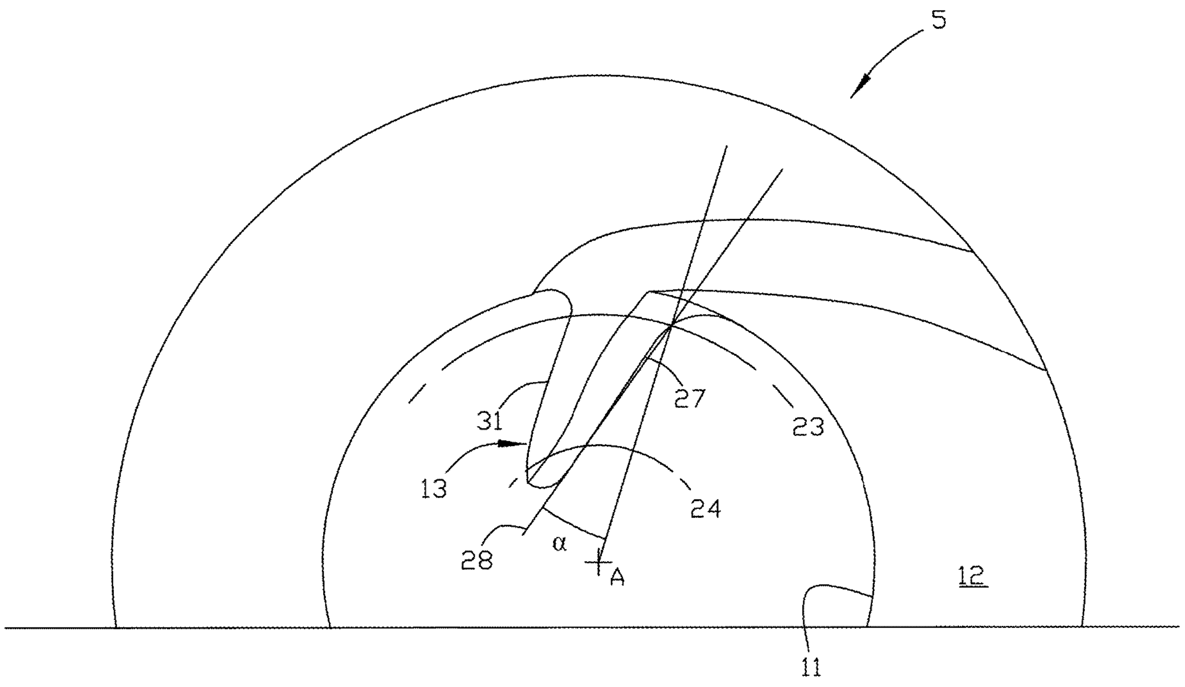
FIG. 10 is a schematic view from above of a part of the impeller seat according to FIG. 6 disclosing a trailing edge angle.
Figure 11:
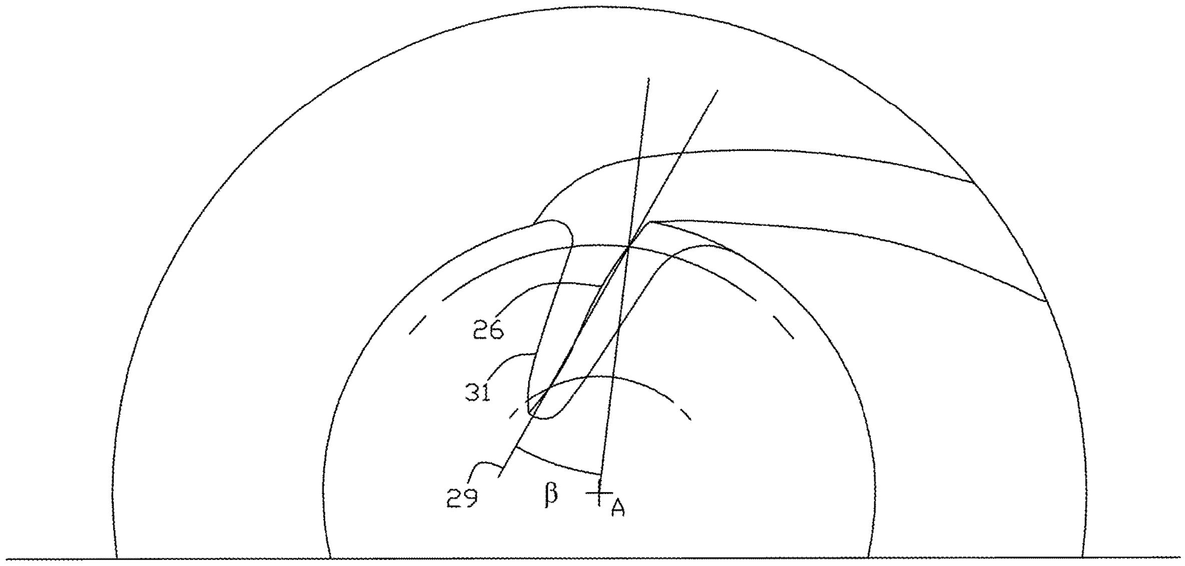
FIG. 11 is a schematic view from above of a part of the impeller seat according to FIG. 6 disclosing a leading edge angle.

The guide pin 13 comprises a leading edge 26 and a trailing edge 27, wherein a trailing edge line 28, see FIG. 10, is an axially projected straight line extending between the intersection between the 15%-circle 23 and the trailing edge 27 of the guide pin 13 and the intersection between the 85%-circle 24 and the trailing edge 27 of the guide pin 13, and wherein a leading edge line 29, see FIGS. 9 and 11, is an axially projected straight line extending between the intersection between the 15%-circle 23 and the leading edge 26 of the guide pin 13 and the intersection between the 85%-circle 24 and the leading edge 26 of the guide pin 13.

It is essential that a trailing edge angle (a) between a radius of the impeller seat 5 intersecting the trailing edge 27 of the guide pin 13 at the 15%-circle 23, and the trailing edge line 28 is equal to or more than 10 degrees and equal to or less than 30 degrees. Preferably the trailing edge angle (a) is equal to or more than 15 degrees and equal to or less than 25 degrees. Thus, the distal end of the guide pin 13 is located upstream the proximal end of the guide pin 13, seen in the direction of rotation of the impeller 7, clockwise in FIGS. 6-11. Thereby, when there is a need for a cleaning sequence due to clogging and the impeller 7 is driven backwards, any solid matter will be raked off from the guide pin 13 more easily, i.e. inwards, instead of being winded around the guide pin 13, due to the angled guide pin 13 and angled trailing edge 27. Thus, the time needed in reverse direction during a cleaning sequence is considerably reduced, i.e. the cleaning is more effective at the same time as the cleaning is more efficient.

According to various embodiments, the trailing edge 27 of the guide pin 13 is principally straight between the 15%-circle 23 and the 85%-circle 24. A distinct concave shape of the trailing edge counteracts the rake off effect. A distinct convex shape of the trailing edge enlarges the guide pin and obstruct more than needed of the inlet of the impeller seat.

According to various embodiments, a leading edge angle (β) between a radius of the impeller seat 5 intersecting the leading edge 26 of the guide pin 13 at the 15%-circle 23 and the leading edge line 29 is equal to or more than 10 degrees and equal to or less than 30 degrees. Thereby the solid matter at the leading edge 18 of the blade 17 is more easily scraped off.

According to various embodiments, the leading edge 26 of the guide pin 13 is principally straight between the 15%-circle 23 and the 40%-circle 25.

According to various embodiments, at least one portion of an upper surface 30 of the guide pin 13 is a plane surface, said at least one portion being defined by the 15%-circle 23, the 85%-circle 24, the leading edge 26 and the trailing edge 27. In this preferred context the term plane surface means that any straight line joining any two points on the surface lies entirely on said surface. According to various embodiments, said at least one portion of the upper surface 30 of the guide pin 13 is tilted in relation to a horizontal plane, wherein the distal end of the guide pin 13 is located upstream the proximal end of the guide pin 13, seen in the axial direction. From the proximal end of the guide pin 13 towards the distal end of the guide pin 13, the guide pin 13 has a decreasing height, and the under surface of the guide pin 13 is rounded, in order to prevent solid matter from getting stuck on the underside of the guide pin 13. It is also plausible to have the upper surface 30 of the guide pin 13 bent/curved upstream or downstream in order to follow a corresponding shape of the leading edge of the blade 17 of the impeller 7, wherein the upper surface 30 is still a plane surface. The leading edge 18 of the blade 17 is preferably located in a horizontal plane or in a conical plane wherein the inner part of the leading edge is displaced in the upstream direction.

The distance, i.e. the gap height, between the leading edge 18 of the blade 17 and the upper surface 30 of the guide pin 13 is equal to or more than 0.05 mm and equal to or less than 1 mm, preferably equal to or more than 0.1 mm and equal to or less than 0.5 mm. The same applies to the distance between the upper surface 12 of the impeller seat 5 and the lower edge 20 of the blade 17.

There is a difference between the first embodiment of the impeller seat 5 and the second embodiment of the impeller seat 5. The leading edge 26 of the guide pin 13 according to the second embodiment is constituted by the edge/intersection between the most upstream side surface of the guide pin 13 and the upper surface 30 of the guide pin 13. According to the first embodiment of the impeller seat 5, the guide pin 13, at least between the inlet wall 10 and the 40%-circle 25, comprises a pre-leading edge 31 located upstream the leading edge 26 of the guide pin 13, seen in the direction of rotation of the pump 1 and seen in the axial direction. According to the second embodiment of the impeller seat 5, the guide pin 13 comprises no such pre-leading edge or just a short pre-leading edge.

Figure 12:
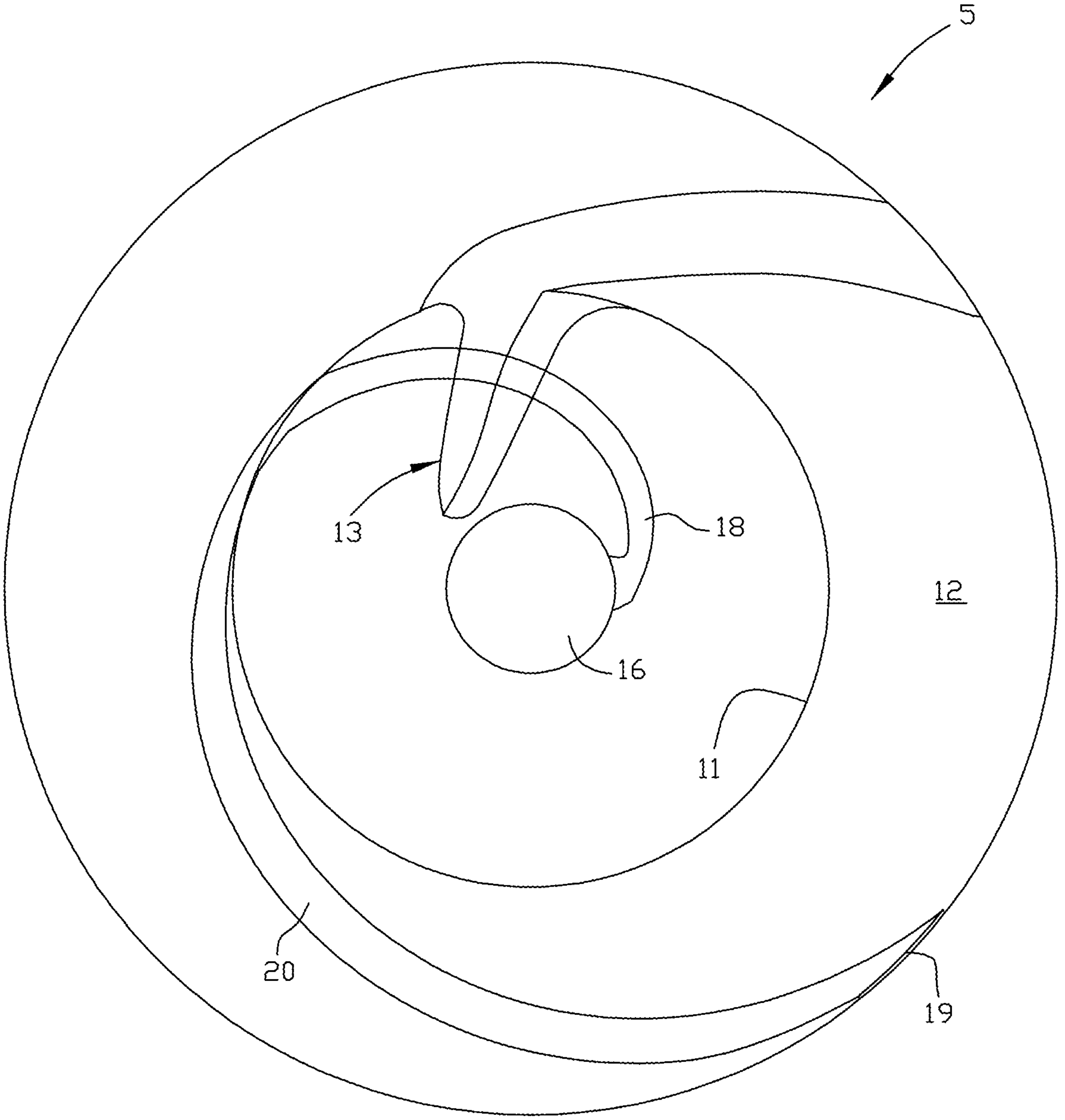
FIG. 12 is a schematic view from above of the impeller seat according to FIG. 6 and also disclosing a projection of the free rim of a blade of the impeller according to FIG. 4.
Figure 13:
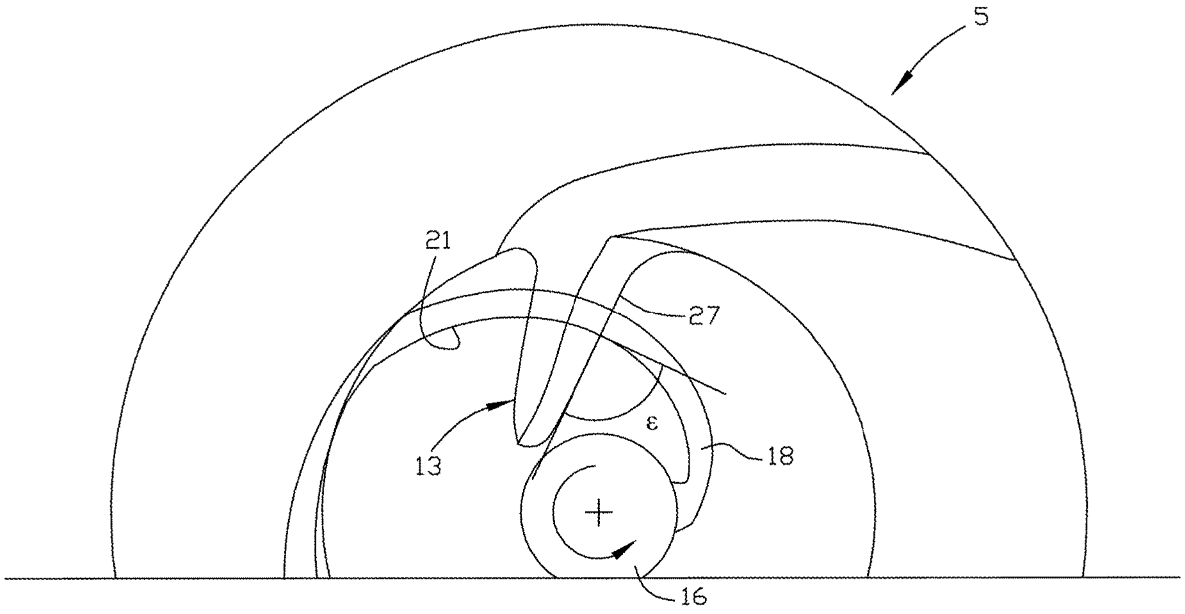
FIG. 13 is schematic view from above of a part of FIG. 12 and disclosing a cleaning angle.
Figure 14:
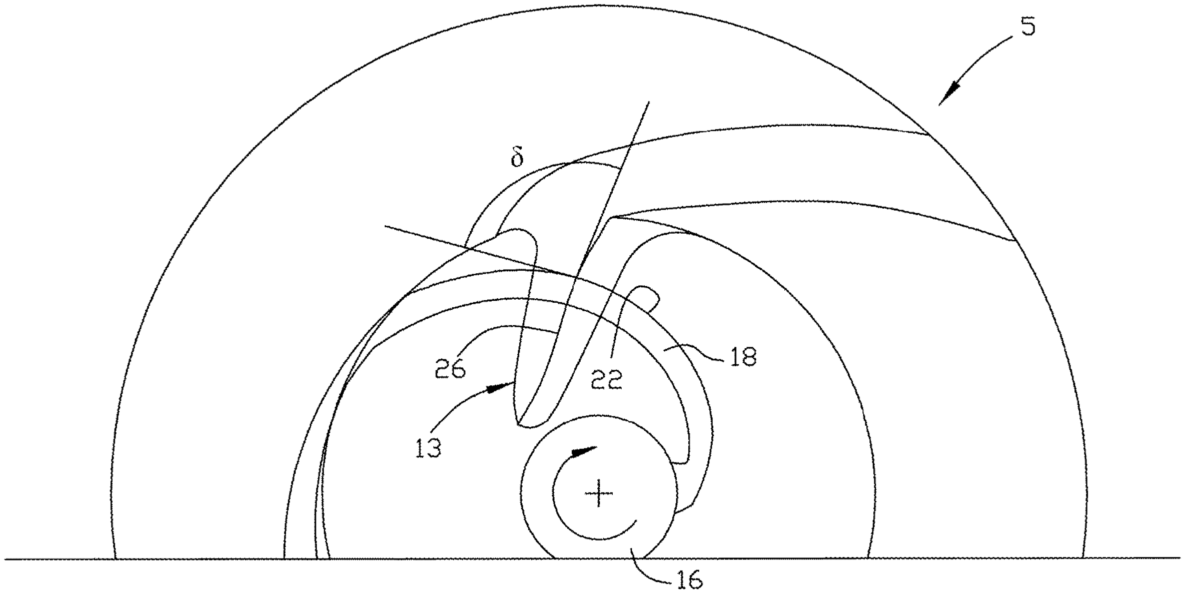
FIG. 14 is schematic view from above of a part of FIG. 12 and disclosing a scraping off angle.

Reference is now made to FIGS. 12-14, wherein the free rim of a blade 17 of the impeller 7 and the hub 16 of the impeller 7 are projected to the impeller seat 5. More precisely, the joint action between the leading edge 18 of the blade 17 and the guide pin 13 is illustrated.

According to various embodiments, the radially inner most part of the guide pin 13 is located radially outside the hub 16 of the impeller 7. Thereby, solid matter may not be trapped between the hub 16 of the impeller 7 and the upper surface 30 of the guide pin 13, and solid matter raked off during reverse operation of the pump 1 will more easily leave the guide pin 13.

According to various embodiments, see FIG. 13, a cleaning angle (c) between a projected tangent to the trailing edge 27 of the guide pin 13 and a projected tangent to the intersection between the leading edge 18 of the blade 17 and the suction side 21 of the blade 17, between the 15%-circle 23 and the 85%-circle 24, is equal to or more than 80 degrees and equal to or less than 120 degrees, and wherein the leading edge 18 of the blade 17 is spirally swept from the hub 16 of the impeller 7 to the lower edge 20 of the blade 17. Thereby any solid matter will be raked off from the guide pin 13 more easily.

According to various embodiments, see FIG. 14, a scraping off angle (6) between a projected tangent to the leading edge 26 of the guide pin 13 and a projected tangent to the intersection between the leading edge 18 of the blade 17 and the pressure side 22 of the blade 17, between the 15%-circle 23 and the 85%-circle 24, is more than 90 degrees and equal to or less than 120 degrees, and wherein the leading edge 18 of the blade 17 is spirally swept from the hub 16 of the impeller 7 to the lower edge 20 of the blade 17. Thereby any solid matter will be scraped off from the impeller 7 more easily.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicate mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A Pump for pumping liquid comprising solid matter, the pump comprising:

an open impeller having:

a cover plate;

a centrally located hub; and at least two spirally swept blades connected to the cover plate and to the hub, each blade having a leading edge adjacent the hub, a trailing edge at a periphery of the impeller, and a lower edge extending from the leading edge to the trailing edge and separating a suction side of the blade from a pressure side of the blade;

an impeller seat having:

an axial inlet defined by an inlet wall and an upper surface located downstream of the axial inlet;

an inlet radius (R) measured from an axially extending centre axis (A) to a circular intersection between the inlet wall and the upper surface of the impeller seats;

a guide pin connected to and extending radially inwards from said inlet wall the guide pin having a tip radius (r) measured from the axially extending centre axis (A) to the radially innermost part of the guide pin, wherein an imaginary 15%-circle is offset radially inwards from said circular intersection fifteen percent of the difference between said inlet radius (R) and said tip radius (r);

an imaginary 85%-circle is offset radially inwards from said circular intersection eighty-five percent of the difference between said inlet radius (R) and said tip radius (r);

a trailing edge line defined by an axially projected straight line extending between the intersection between the 15%-circle and a trailing edge of the guide pin and the intersection between the 85%-circle and the trailing edge of the guide pin; and a trailing edge angle (a) between a first radius of the impeller seat intersecting the trailing edge of the guide pin at the 15%-circle and the trailing edge line is equal to or more than 10 degrees and equal to or less than 30 degrees;

wherein:

the impeller is displaceable back and forth in an axial direction in relation to the impeller seat during operation of the pump; the leading edge of each blade is configured to cooperate with the guide pin of the impeller seat during operation of the pump and the lower edge of each blade is located opposite the upper surface of the impeller seat; a cleaning angle (ε) between a projected tangent to the trailing edge of the guide pin and a projected tangent to the intersection between the leading edge of the blade and the suction side of the blade, between the 15%-circle and the 85%-circle, is equal to or more than 80 degrees and equal to or less than 120 degrees; and the leading edge of the blade is spirally swept from the hub of the impeller to the lower edge of the blade.

2. The pump according to any of claim 1, wherein a radially innermost part of the guide pin is located radially outside the hub of the impeller.

3. The pump according to claim 1, wherein a gap between the leading edge of the blade of the impeller and the upper surface of the guide pin is in a range of equal to or more than 0.05 mm and equal to or less than 1 mm.

4. The pump according to claim 1, wherein the trailing edge angle (a) is in a range inclusively between 15 degrees and 25 degrees.

5. The pump according to claim 1, further comprising:

a leading edge line defined by an axially projected straight line extending between an intersection between the 15%-circle and a leading edge of the guide pin and an intersection between the 85%-circle and the leading edge of the guide pins; and a leading edge angle (β) between a second radius of the impeller seat intersecting the leading edge of the guide pin at the 15%-circle and the leading edge line is in a range of equal to or more than 10 degrees and equal to or less than 30 degrees.

6. The pump according to claim 1, wherein the trailing edge of the guide pin is straight between the 15%-circle and the 85%-circle.

7. The pump according to claim 1, further comprising an imaginary 40%-circle offset radially inwards from said circular intersection forty percent of the difference between said inlet radius (R) and said tip radius (r); and wherein the leading edge of the guide pin is straight between the 15%-circle and the 40%-circle.

8. The pump according to claim 1, wherein at least one portion of an upper surface of the guide pin is a planar surface, said at least one portion being defined by the 15%-circle, the 85%-circle, the leading edge of the guide pin, and the trailing edge of the guide pin.

9. The pump according to claim 8, wherein the at least one portion of the upper surface of the guide pin is tilted in relation to a horizontal plane, wherein the distal end of the guide pin is located upstream a proximal end of the guide pin, seen in an axial direction.

10. The pump according to claim 1, further comprising an imaginary 40%-circle offset radially inwards from said circular intersection forty percent of the difference between said inlet radius (R) and said tip radius (r), and wherein the guide pin comprises, at least between the inlet wall and the 40%-circle, a pre-leading edge located upstream the leading edge of the guide pin, seen in the direction of rotation of the pump and seen in an axial direction.

11. The pump according to claim 1, wherein a scraping off angle (δ) between a projected tangent to the leading edge of the guide pin and a projected tangent to an intersection between the leading edge of the blade and the pressure side of the blade, between the 15%-circle and the 85%-circle, is more than 90 degrees and equal to or less than 120 degrees.

12. A pump for pumping liquid comprising solid matter, the pump comprising:

an open impeller having:

a cover plate;

a centrally located hub; and at least two spirally swept blades connected to the cover plate and to the hub, each blade having a leading edge adjacent the hub, a trailing edge at a periphery of the impeller, and a lower edge extending from the leading edge to the trailing edge and separating a suction side of the blade from a pressure side of the blade;

an impeller seat having:

an axial inlet defined by an inlet wall and an upper surface located downstream of the axial inlet;

an inlet radius (R) measured from an axially extending centre axis (A) to a circular intersection between the inlet wall and the upper surface of the impeller seat;

a guide pin connected to and extending radially inwards from said inlet wall, the guide pin having a tip radius (r) measured from the axially extending centre axis (A) to the radially innermost part of the guide pin, wherein an imaginary 15%-circle is offset radially inwards from said circular intersection fifteen percent of the difference between said inlet radius (R) and said tip radius (r);

an imaginary 85%-circle offset radially inwards from said circular intersection (11) eighty-five percent of the difference between said inlet radius (R) and said tip radius (r);

a trailing edge line defined by an axially projected straight line extending between the intersection between the 15%-circle and a trailing edge of the guide pin and the intersection between the 85%-circle and the trailing edge of the guide pin; and a trailing edge angle ($\alpha$) between a first radius of the impeller seat intersecting the trailing edge of the guide pin at the 15%-circle and the trailing edge line is equal to or more than 10 degrees and equal to or less than 30 degrees;

wherein:

the impeller is displaceable back and forth in an axial direction in relation to the impeller seat during operation of the pump;

the leading edge of each blade is configured to cooperate with the guide pin of the impeller seat during operation of the pump and the lower edge of each blade is located opposite the upper surface of the impeller seat;

a scraping off angle ($\delta$) between a projected tangent to the leading edge of the guide pin and a projected tangent to an intersection between the leading edge of the blade and the pressure side of the blade, between the 15%-circle and the 85%-circle, is more than 90 degrees and equal to or less than 120 degrees; and the leading edge of the blade is spirally swept from the hub of the impeller to the lower edge of the blade.

* * * * *